United States Patent [19]

Yuito et al.

[11] Patent Number: 5,371,643
[45] Date of Patent: Dec. 6, 1994

[54] MAGNETORESISTIVE HEAD STRUCTURE THAT PREVENTS UNDER FILM FROM UNDESIRABLE ETCHING

[75] Inventors: Isamu Yuito, Ome; Makoto Morijiri, Kanagawa; Tooru Takeura, Kanagawa; Katsunori Ohwada, Kanagawa; Masahiro Kitada, Hamura, all of Japan

[73] Assignee: Hitachi, Ltd., Tokyo, Japan

[21] Appl. No.: 927,955

[22] Filed: Aug. 11, 1992

Related U.S. Application Data

[63] Continuation-in-part of Ser. No. 792,630, Nov. 15, 1991, Pat. No. 5,212,609.

[30] Foreign Application Priority Data

Aug. 23, 1991 [JP] Japan .................. 3-211874

[51] Int. Cl.$^5$ ................................. G11B 5/33
[52] U.S. Cl. ............................. 360/113; 29/603
[58] Field of Search ................ 360/113; 29/603; 338/32 R; 324/252

[56] References Cited

U.S. PATENT DOCUMENTS

| | | | |
|---|---|---|---|
| 5,010,433 | 4/1991 | Kitada et al. | 360/113 |
| 5,095,397 | 3/1992 | Nagata et al. | 360/113 |
| 5,225,951 | 7/1993 | Kira et al. | 360/113 |
| 5,247,413 | 9/1993 | Shibata et al. | 360/113 |

FOREIGN PATENT DOCUMENTS 60-45922 12/1985 Japan .

OTHER PUBLICATIONS

Recording Characteristics of MR Head for Hard Disk Drive; S. Fuchigami et al; 1989, p. 228.
Lazzari, et al., "Integrated Magnetic Recording Heads", IEEE Transactions on Magnetics, vol. Mag-7, No. 1, Mar. 1971.

*Primary Examiner*—John H. Wolff
*Assistant Examiner*—William R. Korzuch
*Attorney, Agent, or Firm*—Fay, Sharpe, Beall, Fagan, Minnich & McKee

[57] ABSTRACT

A magnetoresistive head is fabricated with a high yield rate by preventing the electrode film from breaking down. An upper shield film is formed with an electrode separation layer and an upper gap film disposed between it and the electrode film. The electrode film is prevented from being etched when the upper shield film is subjected to ion milling as a result. Further, the upper gap film is laid on top of the electrode separation layer, and a lead is satisfactorily protected and prevented from being exposed. Thus, the upper shield film and the lead are prevented from becoming short-circuited as a result of the disconnection of the electrode film and the exposure of the lead.

11 Claims, 6 Drawing Sheets

MAGNETORESISTIVE HEAD STRUCTURE THAT PREVENTS UNDER FILM FROM UNDESIRABLE ETCHING

This is a continuation-in-part application of Ser. No. 07/792,630 filed Nov. 15, 1991, now U.S. Pat. No. 5,212,609.

BACKGROUND OF THE INVENTION

1. FIELD OF THE INVENTION

The present invention relates to a magnetoresistive reproducing head used for playback of magnetic disk apparatuses or magnetic tape apparatuses such as VTRs.

2. DESCRIPTION OF RELATED ART

Recent magnetic recording apparatuses have increased recording capacity. To accomplish this, as an example, the magnetic disk apparatus is made to have a track width as narrow as 5–6 μm. As the size of the apparatus decreases, the media velocity also decreases. In order to detect signals recorded in such narrow areas at a high signal-to-noise ratio, magnetoresistive heads have been developed in place of the conventional inductive heads. As an example, the magnetoresistive head is made in a structure shown in FIGS. 3(a) and 3(b) (see, for example, the Japanese Patent Laid-Open 60-45922 and the Digests of 13th Annual Conference on Magnetics in Japan, 1989, pp. 228). The magnetic head shown in these figures are called a shunt bias magnetoresistive head.

The magnetoresistive head is designed to regenerate a signal from an electric resistance change when a signal field is applied to a magnetoresistive film such as an NiFe film. The electric resistance change is dependent on the magnetic flux but not on speed as in the case of an inductive head. FIG. 3(a) is a plan view for the head, and FIG. 3(b) is a cross-sectional view taken across line A—A' in FIG. 3(a). The magnetoresistive head comprises a lower shield film 2, a lower gap film 3, a magnetoresistive film 4, a shunt bias film 5, an electrode 6, an upper gap film 7, and an upper shield film 8 laminated on a non-magnetic substrate 1. In general, all the films except the lower shield film 2 and the upper shield film 8 are made very thin. The magnetoresistive film 4, for example, is a few 10 nm thick, and the lower gap film 3 and the upper gap film 7 are around 0.2 μm.

In order to allow the magnetoresistive head to play back the high density recorded signals with a high signal-to-noise ratio, the magnetoresistive film 4, the upper gap film 7 and the lower gap film 3 are formed very thin. With such thin films, the under film of the film to be etched is undesirably subjected to etching during patterning. In the worst case, the under film may vanish, particularly when the film to be etched is relatively thick as compared to the thin under film. In the magnetic head shown in FIGS. 3(a) and 3(b), the problem of undesirable etching of the upper gap film 7 and the electrode 6 formed under the upper gap film 7 occurs in the patterning of the upper shield film 8.

FIGS. 4(a) and 4(b) illustrate the undesirable etching or over etching problem that occurs in the patterning of the upper gap film 7 and upper shield film 8, respectively. As shown in FIG. 4(a), when the upper gap film 7 is patterned an undesired etching of electrode film 6 occurs. The thickness of undesired etching of electrode film 6 is indicated by $t_1$. In FIG. 4(b), the patterning of upper shield film 8 is performed, for example, by ion milling, which causes the upper gap film 7 to be etched undesirably. The thickness of undesirable etching of upper gap film 7 is indicated by $t_2$. As stated above, should the undesired etching exceed the thickness of the electrode film 6 in the fabrication of the magnetoresistive heads, then the yield will decrease sharply.

In general, the thin film formed under the film to be etched for patterning is adversely subjected to etching because of the film thickness distribution and the etching rate distribution within and between the substrates. In particular, the undesirable etching is significant in physical etching methods, such as an ion milling, which have been frequently used in fabricating magnetic heads. As for the magnetoresistive head, as described above, it is formed of very thin films, and the unwanted etching of the under films tends to lower the yield to a great extent. As the length of time during which the primary film is etched is dependent on the thickness of the film to be processed and the distribution of the ion milling speed, roughly 10–20% of the whole ion milling time of the film to be processed is required. With the upper shield film 8 formed of an Ni—Fe alloy 2 μm thick, an $Al_2O_3$ film, if used as the upper gap film 7, will be etched by 150 nm because its ion milling speed is low. This value is substantially equal to the thickness of the upper gap film 7 and it makes the fabrication process margin extremely narrow. As the upper gap film 7 is made thinner with the intention of increasing recording density, the electrode 6 may also be etched and broken down if the worst case situation occurs.

SUMMARY OF THE INVENTION

In view of the foregoing, an object of the present invention is to provide a magnetoresistive head structure used to reproduce high density recorded signals that can be fabricated with a high yield. A particular object of the present invention is to provide a magnetic head structure that can prevent the under film from being subjected to undesirable etching during the etching of the upper film during patterning. More specifically, the object includes preventing an electrode from breaking down when an upper shield film is subjected to ion milling.

Briefly, the foregoing objects are accomplished in accordance with aspects of the present invention by forming a protective film or electrode separation layer under the film to be etched. The protective film or electrode separation layer should be made thick enough to accomplish the objects in connection with the thickness distribution and the etching rate distribution of the film to be etched.

The present invention will be better understood from the following description of the embodiment of the invention taken in connection with the accompanying drawings.

FIG. 1(a) is a cross-section of a magnetic head of the first embodiment of the present invention, corresponding to the cross-section in FIG. 3(b) taken across A—A' in FIG. 3(a). FIG. 1(b) is a plan view for the magnetic head of FIG. 1(a).

First, as shown in FIGS. 1(a) and 1(b), there is formed on a non-magnetic substrate 1 a lower shield film 2, a lower gap film 3, a magnetoresistive film 4, a shunt bias film 5 for applying a bias magnetic field to the magnetoresistive film 4, an electrode 6 electrically connected with the magnetoresistive film 4, and an upper gap film 7. Then, a protective film 9 is formed as shown. The protective film 9 which is an electrically insulating material does not reach a surface facing a recording medium or air bearing surface 12. The protective film 9 also covers the upper gap film 7 and the electrode 6. In turn, an upper shield film 8 is formed on the protective film 9 and on the portion of the lamination which is on the side of the air bearing surface 12 and which is not covered with the protective film 9. Then, the upper shield film is patterned. An end of the upper shield film 8 opposite to the air bearing surface 12 is formed to reach the protective film 9. Such structure prevents the electrode 6 and the upper gap film 7 from being subjected to etching when the upper shield film 8 is subjected to etching for patterning.

The electrode 6 should be connectable to other circuits and this becomes possible by removing a part of the protective film 9. The thickness of the protective film 9 should be determined in connection with the film thickness distribution and etching rate distribution of the upper shield film 8. That is, the protective film 9 should be thicker as the difference of the maximum and minimum film thicknesses of the portion to be etched of the upper shield film 8 and the difference of the maximum and minimum etching rates of the portion to be etched of the upper shield film 8 are made larger. The protective film 9 also should be thicker as the under film of the upper shield film 8 is made thinner and the etching rate of the under film is larger. It is practical to make an experiment on a magnetic head of the same structure as the one to be manufactured and to make it have the protective film of a thickness which does not cause adverse etching for the under film.

There is the possibility that the protective film 9 may disappear in etching if its thickness is thinner than 0.1 $\mu$m. Even if it is made thicker than 2 $\mu$m, it cannot be expected to increase its effect. In general, therefore, the protective film 9 is often made in a range of 0.1 to 2 $\mu$m thick. It is not always limited in this range as the proper thickness may change depending on the combination of the constituting films. It is usually sufficient to make it 1 $\mu$m thick.

The protective film 9 may be made of an inorganic material such as $Al_2O_3$ of an organic material such as photoresist or similar materials that can endure additional processes after forming, particularly heat treatment. The heat treatment mentioned above is made in a temperature range of 150° to 300° C. for the magnetic material in a magnetic field and for bonding wires. The inorganic protective film materials available besides $Al_2O_3$ include oxides of Si, nitrides of Si, nitrides of Al, $Al_2O_3$—$Ta_2O_5$ or the like. The organic protective film materials available include novolak resins such as the AZ resist (a trade mark of Hoechst Co.) and the OFPR resist (a trade mark of Tokyo Ohka Kogyo Co., Ltd.) as the photoresist, or polyimide resins such as the PIQ (a trade mark of Hitachi Chemical Co., Ltd.).

As described above, in the magnetoresistive head according to the first embodiment of the present invention, there is an etched end 11 formed adjacent the protective film 9 of the upper shield film 8 which is the end thereof on the opposite side to the air bearing surface 12.

The non-magnetic substrate 1 used for the magnetoresistive head shown in FIGS. 1(a) and 1(b) according to the present invention is composed of a non-magnetic insulating plate which can endure the heat treatment mentioned above. Alternatively, it can be made of a ferromagnetic material such as Mn—Zn ferrite or Ni—Zn ferrite. In this case, the lower shield film 2 is not needed.

According to another embodiment of the invention as shown in FIGS. 5(a) and 5(b), a laminated area or electrode separation area 33 is formed by directly laying the upper gap film 27 on the under gap film 23 with one end of the upper shield film formed on the laminated area. In other words, as shown in FIG. 5(b), a primary film as an area which poses problems when an upper shield film 28 is subjected to milling is formed with a thick insulating film comprising an upper gap film 27 and an under gap film 23, so that the thickness of the primary film beneath the upper shield film 28 may be increased.

It is also preferred in the embodiment of the invention of FIGS. 5(a) and 5(b) to provide through-holes in the upper or under gap layer so as to solve the problem arising from the disconnection of the conductive film used for supplying current to a magnetoresistive film in the laminated area. In other words, an electrode film to be connected to the magnetoresistive film between the upper and under gap layers and a lead should be connected via the through-holes. As specifically shown in FIG. 5(b), an electrode film 26 connected to a magnetoresistive film 24 is connected to a lead 31 via the through-holes in the under gap film 23.

DETAILED DESCRIPTION OF THE EMBODIMENTS

The present invention is illustrated in further detail by reference to the accompanying drawings.

Figure 1:
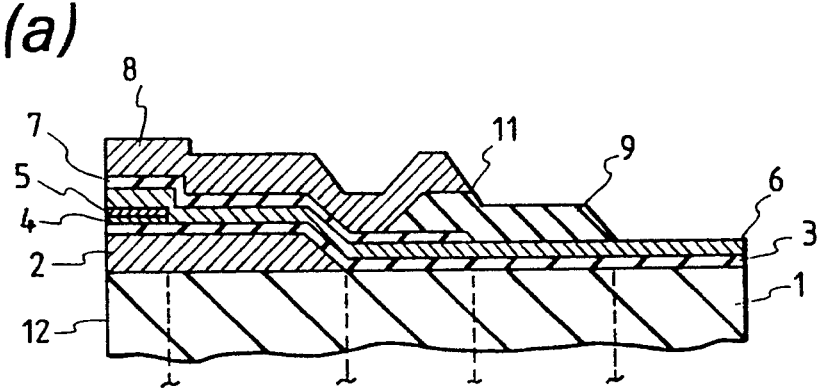
FIG. 1(a) is a cross-sectional view and FIG. 1(b) is a plan view of a shunt bias magnetoresistive head constructed according to a first embodiment of the present invention.
Figure 1:
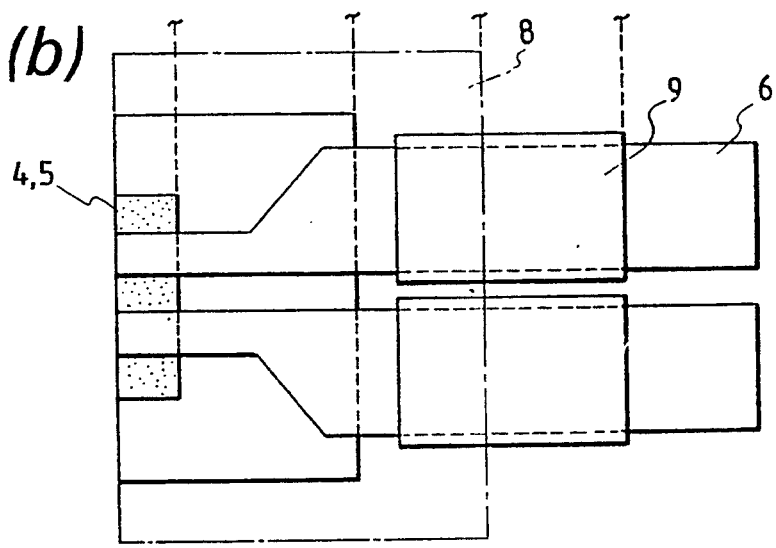

The first embodiment of the present invention is described below by referring to FIG. 1. The non-magnetic substrate 1 is an $Al_2O_3$—TiC plate. Firstly, the lower shield film 2 is formed as a thin Ni—Fe alloy film on the non-magnetic substrate 1 by a sputtering method to a thickness of 3 $\mu$m. Patterning is then performed by an ion milling method with photoresist film used as a mask.

Thereafter, a lower gap film 3 is formed of $Al_2O_3$ by a sputtering method to a thickness of 0.19 $\mu$m. Formed on the lower gap film 3 is an Ni—Fe alloy film for the magnetoresistive film 4 and an Nb film for the shunt bias film 5 which are formed continuously thereon by a vacuum evaporation method to respective thicknesses of 25 nm and 36 nm. Patterning for both films used is preferably conducted by an ion milling method with the photoresist film as a mask. In this step of the process, the lower gap film 3 also may be etched, but no problems are caused since the amount of etching is likely to be only 2-3 nm. The reason for this is that the magnetoresistive film 4 and the shunt bias film 5 are thin, and the milling rate of the $Al_2O_3$ material of the lower gap film 3 is slow as compared with both films.

In the next step, the electrode 6 is formed of Cr/Cu/Cr laminated film by a vacuum evaporation method or a sputtering method. The underlayer of Cr serves to increase adhesion to the under film 3, and the top layer of Cr prevents oxidation of the Cu layer in the process and increases the adhesion as well. Their respective thicknesses are 0.02 $\mu$m, 0.4 $\mu$m, and 0.02 $\mu$m. Patterning, as mentioned above, is conducted by an ion milling method with a photoresist used as a mask. In this step of the process, the shunt bias film 5 and the lower gap film 3 are subjected to etching, but the amount of etching is small. The reason for this is that the Cr layer is very thin, and the milling rate for Cu is high as compared with that for the $Al_2O_3$ material of the lower gap film 3 and the Nb material of the shunt bias film 5. The upper gap film 7 is formed of the same $Al_2O_3$ material as the lower gap film 3. Its thickness is 0.15 $\mu$m. Patterning, used as mentioned above, is performed by the ion milling method with the photoresist as a mask. The patterning for the upper gap film 7 may involve the problem of etching the electrode 6. In this step of the process, the electrode 6, which is the under film, has a higher milling rate than the $Al_2O_3$ film which is the upper gap film 7. The time during which the electrode 6 is subjected to the etching is around 10% of the etching time for the upper gap film 7. The electrode 6 is subjected to etching to a depth of about 75 nm as the milling rate ratio of Cu to $Al_2O_3$ is around 5. This causes virtually no adverse effect since the electrode 6 is around 0.4 $\mu$m thick as described above.

Next, the protective film 9 is formed of a photoresist film (OFPR800, a trade name of Tokyo Ohka Kogyo Co., Ltd.). The photoresist film thickness is made to be about 1 $\mu$m thick by a coating method. Exposure and developing are made to coat the electrode 6 and a part of the upper gap film 7 with the photoresist film.

As described above, it is sufficient for the present invention that the protective film 9 should be provided over an area in which the portion to be etched of the upper shield film 8 and the electrode 6 overlap. If this condition is met, the extension of the protective film 9 toward the air bearing surface 12 from the etching end 11 of the upper shield film 8 can possibly be made narrow. As a practical matter, given the present level of fabrication accuracy, however, the protective film 9 has to be extended at least 1 $\mu$m toward the air bearing surface 12 of the upper shield film 8. The end of the protective film 9 opposite to the air bearing surface 12, as will be described later, is formed in a step that occurs after the upper shield film 8 is made. Then, the protective film 9 is removed to expose the electrode 6.

The distance between the shields, or the distance between the upper shield film 8 and the lower shield film 2 in the vicinity of the magnetoresistive film 4 has to be made as thin as possible in order to obtain high resolution, since the resolution is lowered as the distance is increased. For this reason, the protective film 9 should not be formed at the place right above the magnetoresistive film 4.

In the present embodiment, the protective film 9 is not formed or is made so as not to exist in a range of 20 $\mu$m from the air bearing surface 12 in a direction perpendicular thereto. On the other hand, the protective film 9 is made to extend 5 $\mu$m toward the air bearing surface 12 from a position corresponding to the etching end 11 of the upper shield film 8. The protective film 9 is further made to extend at least 1 $\mu$m from each of the widthwise ends of the electrode 6 parallel to the air bearing surface 12 in order to have enough margin for maintaining processing accuracy. The protective photoresist film 9 is heat treated at 250° C. for three hours to endure following heat treatment.

Next, the NiFe film is formed to 1 $\mu$m in thickness over an area within 25 $\mu$m from the air bearing surface 12 in the sputtering method to become the upper shield film 8. Needless to say, the lower shield film 2 and the upper shield film 8 should entirely cover the magnetoresistive film 4. The depth of magnetoresistive film 4 from the air bearing surface 12 in a direction perpendicular to the air bearing surface 12 was preferably made less than 5 $\mu$m, and the depth of the lower shield film 2 and the upper shield film 8 are made greater than that.

Patterning of the upper shield film 8 is made by the ion milling method with a photoresist film used as a mask. The protective film 9 is subjected to etching during the etching of the upper shield film 8. The period of etching for the protective film 9 is around 10% of the etching time for the upper shield film 8 as in the case described above. The amount of etching for the protective film 9 is around 0.1 $\mu$m, since the milling rate of the NiFe film of the upper shield film 8 is virtually the same as the milling rate of the protective photoresist film 9. The initial thickness of the protective film 9 is 1 $\mu$m, which is enough to protect the electrode 6 and the upper gap film 7 from being subjected to etching.

Although the protective film 9 is disclosed as being 1 $\mu$m thick, it should only protect the electrode 6 and upper gap film 7 against the etching of the upper shield film 8. It may be made approximately 0.1 $\mu$m thick at a minimum. It is preferably 0.2 $\mu$m or thicker in view of ensuring an accurate fabrication margin for the process.

Finally, as described above, a part of the protective film 9 is removed to form a through hole for connection of the electrode with external circuits. For this, patterning is performed by a reactive ion etching method using an oxygen gas with a resist film used as a mask. In the present embodiment, the end of the protective film 9 is extended 10 $\mu$m from a position corresponding to the etching end 11 in a direction opposite to the air bearing surface 12.

The NiFe alloy used for the magnetoresistive film 4, the upper shield film 8 and the lower shield film 2 in the present embodiment contains 82 wt % Ni.

As described above, the distance between the shield films should be narrow in order to obtain high resolution, and in the present embodiment it is 0.4 $\mu$m thick. In general, the distance between the shield films is made to correspond to the length of a bit to be recorded. The bit density can be made high since the bit length is short. In the present invention, the distance between the lower shield film 2 and the upper shield film 8 is not limited to any distance. According to the present invention, the distance can be made narrower than 0.6 $\mu$m, or around 0.3 $\mu$m, as desired. In addition, the present invention can avoid the undesirable etching of the under film in the patterning of the upper shield film 8.

So far, a shunt bias magnetoresistive head has been described as the preferred embodiment of the present invention. In addition to this, the present invention is effective for magnetoresistive heads of other bias types, such as a soft film bias type, a composite type combining the shunt bias type and the soft film bias type, and the like.

Also, the present invention is similarly effective for a magnetic head having a magnetic domain control film formed at both track widthwise ends of the magnetoresistive film 4. The magnetic domain control film that is available is FeMn anti-ferromagnetic film or the like.

Figure 2:
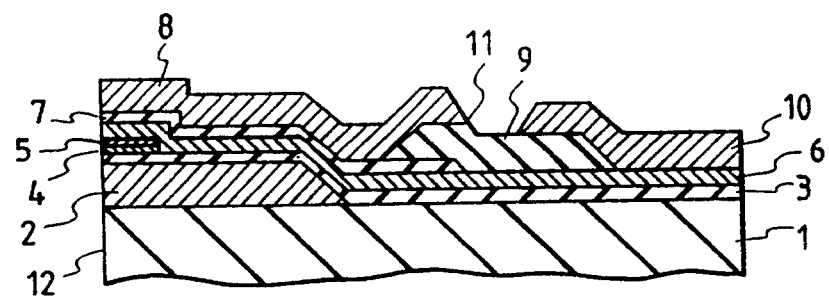
FIG. 2 is a cross-sectional view of a shunt bias magnetoresistive head constructed according to a second embodiment of the present invention.
Figure 3:
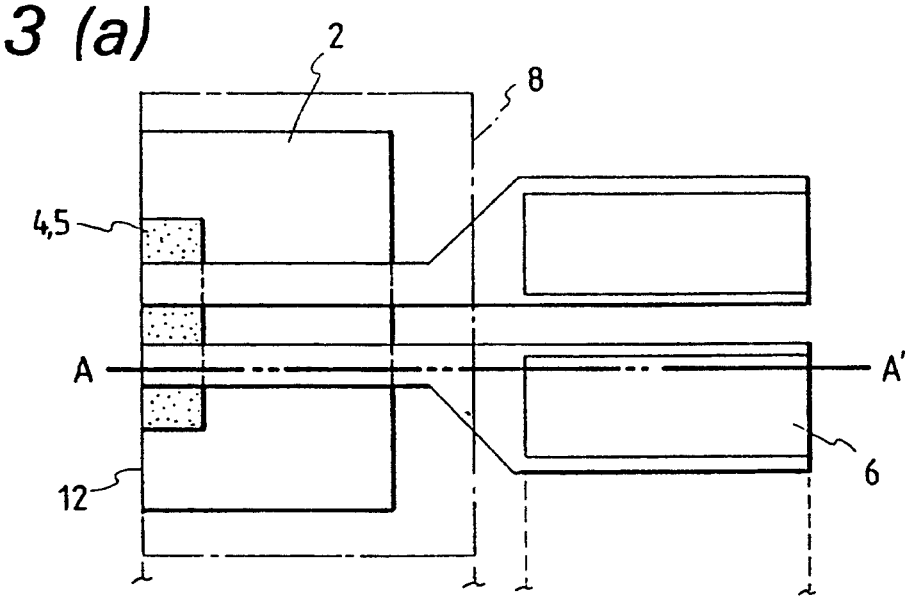
FIG. 3(a) is a plan view and FIG. 3(b) is a cross-sectional view of a conventional shunt bias magnetoresistive head.
Figure 3:
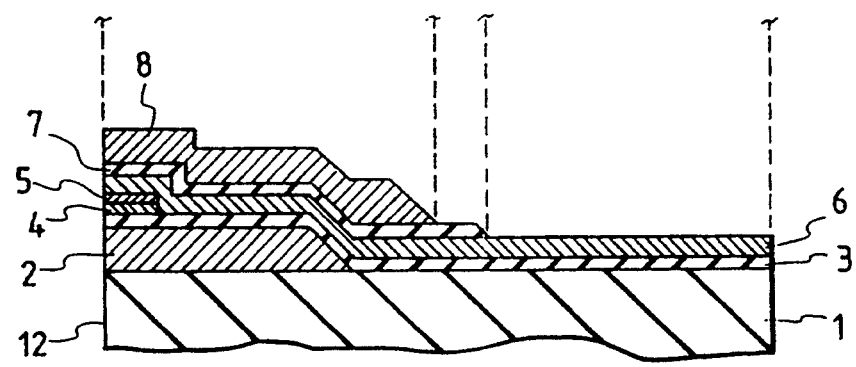
Figure 4:
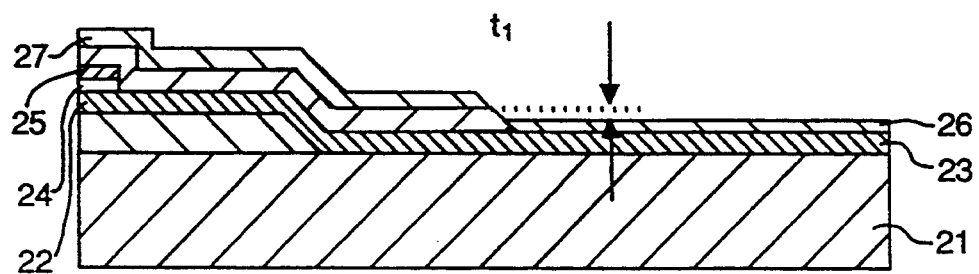
FIGS. 4(a) and 4(b) show an analysis of an undesired etching problem that occurs in the formation of a conventional magnetoresistive head, which analysis is part of the present invention.
Figure 4B:
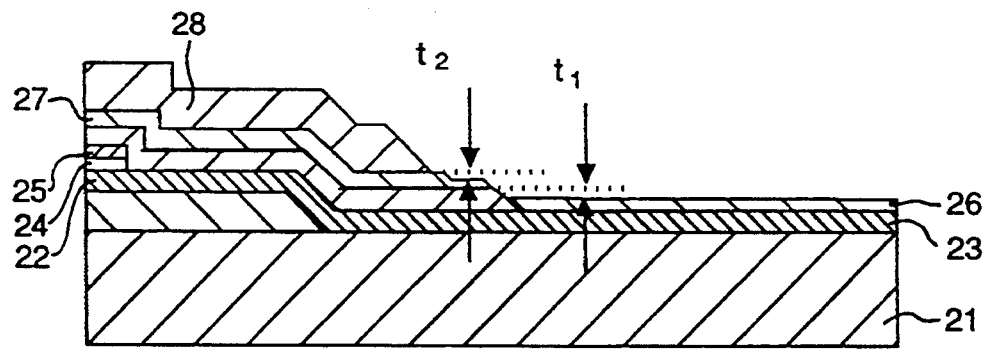

The invention can be practiced according to a second embodiment of a magnetoresistive head that reduces head noise and simplifies the production process. Reduction in the head noise can be effectively accomplished by reducing the electrical resistance of the electrode 6. FIG. 2 is a cross-sectional view of a magnetic head constructed according to the second embodiment, corresponding to a cross-sectional view taken across line A—A' in FIG. 3. The present embodiment has a conductor layer 10 formed on the electrode 6 to reduce the electrical resistance of the electrode 6. The conductor layer 10 may be desirably made somewhat larger than the electrode 6. In order to have an accurate fabrication margin for the process and to avoid the existence of any portions of the electrode 6 uncovered by the conductor layer 10, the conductor layer 10 should be shaped so that the ends of the conductor layer 10 extend at least 1 $\mu$m, usually less than 3 $\mu$m, beyond the end of the electrode 6.

The conductor layer 10 needs no lower thickness limit as it is effective in itself to reduce the resistance as long as it is provided. The upper thickness limit of the conductor layer 10 is around 2 $\mu$m. The conductor layer 10 is usually thicker than 2000 Å as the electrode 6 is often made around 2000 Å thick.

It is effective to make the upper shield film 8 also serve as the conductor layer 10. This can reduce the electric resistance without increasing the number of processing steps. In the first embodiment described above, the protective film 9 was made to cover the entire surface of the electrode 6 before through holes were formed. In the second embodiment, the inventors form a through hole in the exposure and development steps before they form the conductor layer 10 of the upper shield film 8 so as to cover a part of the protective film 9. That is, this is done to avoid undesirable etching of the upper gap film 7 and electrode 6 during patterning of the conductor layer 10. The etching ends in patterning of the conductor layer 10 and patterning of the upper shield film 8, and each are made to exist on the protective film 9. It is therefore preferable that the protective film 9 extends more than 1 $\mu$m from each of the etching ends of the conductor layer 10 towards the air bearing surface side of the head. This is also similar to the patterning of the upper shield film 8 described previously. Such a process not only prevents the electrode 6 and the upper gap film 7 from being etched during the etching step for the upper shield film 8, but also omits the step for forming the through holes on the protective film 9.

Reduction of the electrical resistance of the electrode 6 can also be effectively made by forming a conductor layer under the electrode 6. For example, the lower shield film 2 can be used to form the conductor layer to reduce the electrical resistance without increasing the number of processing steps.

In accordance with the first and second embodiment of the present invention, the electrode 6 and the upper gap film 7 except in the vicinity of the air bearing surface 12, are covered by the protective film 9. This prevents the electrode 6 and upper gap film 7 from being undesirably etched during etching of the thick upper shield film 8. This protection is particularly effective for the thinner electrode 6 and the upper gap film 7. As an example, the yield of the magnetic head having the film thicknesses given in the first embodiment was found to be around 30% as it had no protective film, but that of the magnetic head having the protective film according to the present invention was found to be about 100%.

The electrical resistance of electrode 6 can be reduced to around 2 $\Omega$ since the upper shield film 8 of 1 $\mu$m thick is laminated on it. This effect is further increased when the lower shield film 2 is made to also serve as the electrode.

Figure 5:
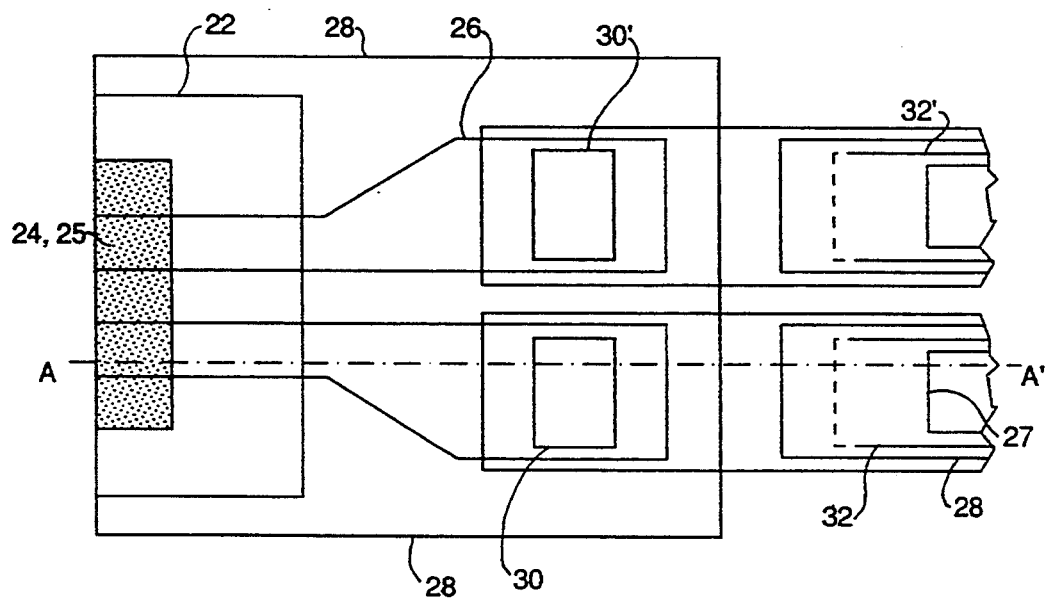
FIGS. 5(a) and 5(b) show a plan view and cross-sectional view of a magnetoresistive head constructed according to a third embodiment of the present invention.
Figure 5:
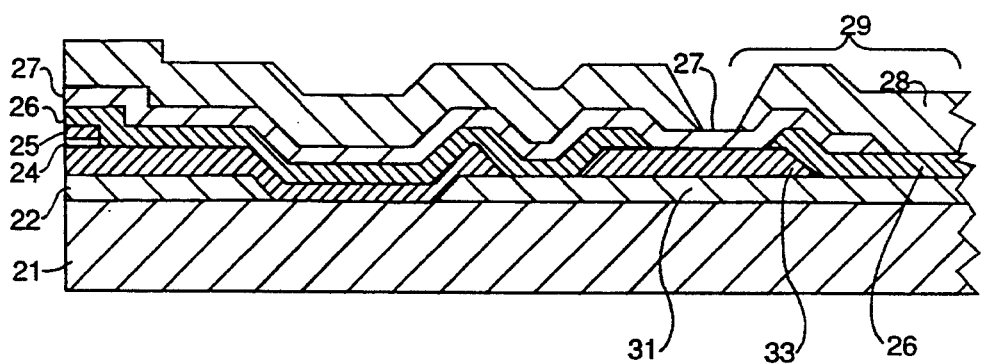

Referring to FIGS. 5(a) and 5(b), the functions of the present invention will be described with reference to a third embodiment of the invention. FIG. 5(a) is a top view and FIG. 5(b) is a sectional view taken on line A—A' of the former. First, an under shield film 22 and the lead 31 are formed on a substrate 21. The formation of the lead 31 with the under shield film is preferred because the process of manufacture is simplified. The magnetoresistive film 24, a shunt bias film 25 and the under gap film 23 are successively stacked. Through-holes 30, 30' and 32, 32' for electrically connecting the electrode 26 and the lead 31 are formed in the under gap film 23. The under gap film formed in between the through-holes 30, 30' and 32, 32' is hereinafter called an electrode separation layer 33.

Subsequently, the electrode film 26 is formed. In this case, an electrode separation layer 33 is used to separate the electrode film 36, which is, however, electrically connected to the lead 31. The electrode film 26 should also preferably be formed in the through-holes 32, 32' in order to reduce the whole electrical resistance of the head. The upper gap film 37 is formed so that at least part of it directly contacts the electrode separation layer 33. Moreover, one end of the upper shield film 28 is processed in such a way that the upper gap film 27 and the electrode separation layer 33 form areas in direct contact with each other.

With the arrangement described above, the electrode film 26 is prevented from being directly subjected to ion milling during the ion milling of the upper-shield film 28 and consequently the disconnection of the electrode film 26 is prevented. Moreover, as the thick insulating film composed of the electrode separation layer 33 and the upper gap film 27 is made as a stopper film when the upper shield film 28 is processed by ion milling, the lead is protected likewise. As a result, the magnetoresistive head can be formed at a high yield rate to ensure that current is drawn out.

Referring to FIGS. 6(a)–6(f), several of the process steps followed in the fabrication of the magnetoresistive head of the third embodiment of the invention will be described.

First, in an initial step not shown, an under shield film 22 is formed on a substrate 21. The substrate 21 is an $Al_2O_3$—TiC plate. The under shield film 22 is a thin NiFe alloy film, which is formed by sputtering. The surface of the under shield film 22 should be as flat as possible in order that the properties of a magnetoresistive effect film 24 to be formed later are not deteriorated. Special care ought to be taken particularly when the magnetoresistive film 24 is made thin. In this case, amorphous soft magnetic films of Co family such as CoTaZr, CoCrzr, CoWZr, CoMoZr and the like are especially effective in view of heat and corrosion resistance. The film thickness is 3 μm. As long as the thickness of both shield films 22, 28 is not less than 0.5 μm in a low recording density area, substantially the same shielding effect is achieved. However, they should be thicker as the recording density is increased. Notwithstanding, it is not preferred to increase the film thickness because then the processing time also increases. In other words, the thickness should preferably be set at an optimum value in consideration of the process involved.

Next an ion milling technique is used to carry out patterning of the under shield film 22 with a photoresist film used as a mask. A lead 31 is simultaneously formed with the under shield film 22 to form the structure shown in FIG. 6(a). To lower the electrical resistance of a head, the lead should preferably be made of Al, Au, W or Cu having a low resistivity or an alloy containing these materials. However, the shortcoming is that the manufacturing or fabricating process tends to become complicated. The selection of an optimum material in consideration of the process involved is preferred.

Figure 6:
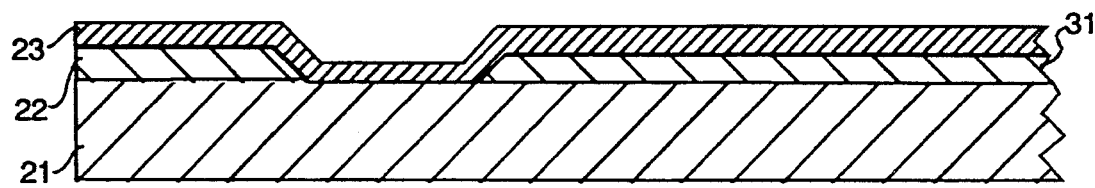
FIGS. 6(a)–6(f) show certain process step followed in the fabrication of a magnetoresistive head constructed according to the embodiment of the invention shown in FIGS. 5(a) and 5(b).
Figure 6:
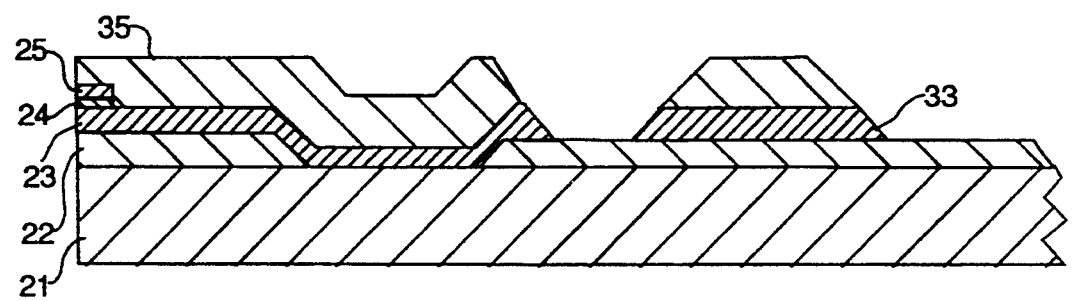
Figure 6:
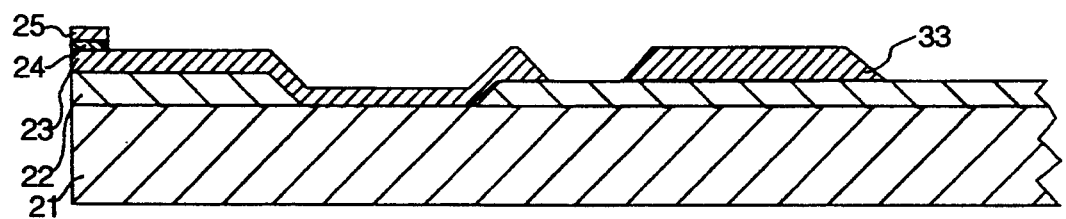
Figure 6:
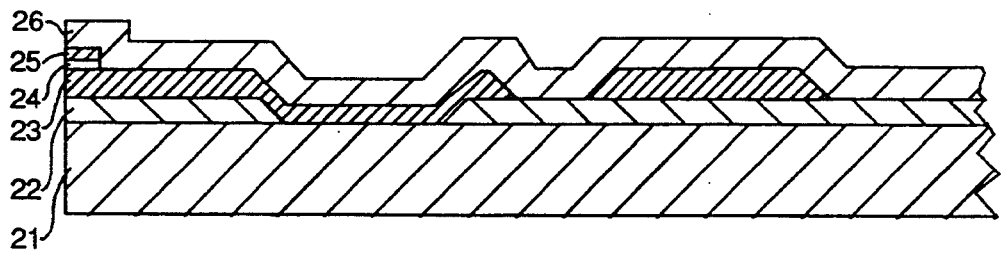
Figure 6:
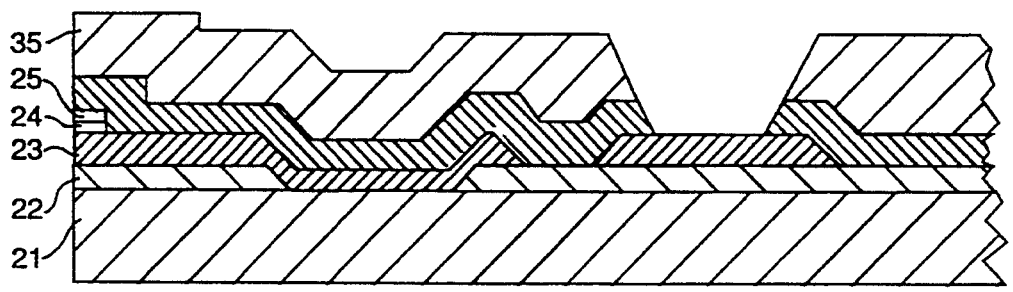
Figure 6:
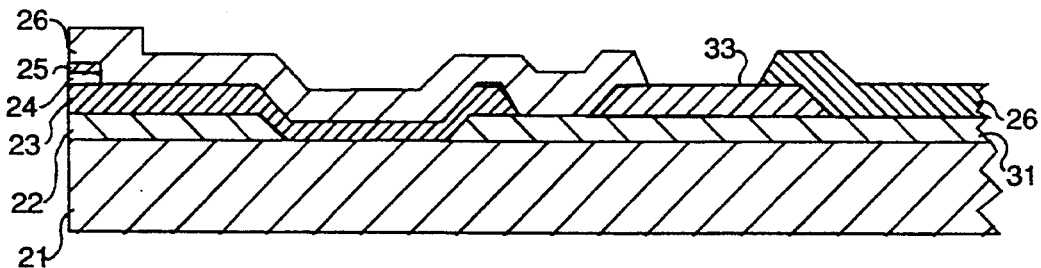

As also shown in FIG. 6(a), $Al_2O_3$ is used to form an under gap film 23 by sputtering. The film thickness is, for example, approximately 0.18 μm. The thickness of the under gap film 23 and the upper gap film 27 should be varied in proportion to the recording density required. When high-density recording with a linear density at $-6$ dB signal value exceeding 100 kFCI (Flux Change per Inch) is intended, the film thickness should be set at about 0.1 μm.

After the under gap film 23 is formed, the magnetoresistive film 4 of an Ni—Fe alloy and an Nb film, which is a shunt bias film are continuously formed on the under gap film 23. The formation of these films is carried out by vacuum deposition in process steps not shown. The film thicknesses are preferably 35 nm and 50 nm, respectively. The thicknesses of both films is set so that the current shunt ratio of the magnetoresistive film 24 to the shunt bias film 25 ranges from about 0.8 to about 1.5. If the shunt bias film range is too thick, the bias magnetic field will intensify and the regenerative output will decrease, whereas the output will increase if it is too thin and a large current will be required to obtain an optimum bias magnetic field. The patterning of both films is collectively carried out by ion milling. Although the under gap film 23 is etched at this process step, the etching amount is only several nm and therefore poses no problem. This is because the thickness of the magnetoresistive film 24 and the shunt bias film 25 is small and because the milling speed of the under gap film 23 of $Al_2O_3$ is lower than that of both films described above.

Through-holes 30, 30' and 32, 32' are formed in the under gap film 3 on the lead 11. FIG. 6(b) shows the patterning step, which is carried out by ion milling with a photoresist film 35 used as a mask. The remaining $Al_2O_3$ of film 3 between the through-holes 30, 30' and 32, 32' becomes the electrode separation layer 33. Thereafter, the photoresist is removed to leave a structure as shown in FIG. 6(c).

Next, electrode film 26 is formed as shown in FIG. 6(d). In this case, a laminated film comprising three layers of Cr/Cu/Cr is employed. The bottom layer Cr is used to increase adhesion with the primary film, whereas the Top layer Cr is used to prevent the oxidation of Cu during the process in addition to the improvement of adhesion. The thicknesses of these are 0.1 μm, 0.2 μm, and 0.1 μm, respectively. Patterning is carried out by ion milling with a photoresist film used as a mask. The electrode film 26 is left in such a state that it is cut out on the electrode separation layer 33; however, it remains electrically connected to the lead 11 via the through-holes 30, 30' and 32, 32'. No problem is caused by the formation of the electrode film 26 in the through-holes 32, 32' and on the contrary, the formation thereof is rather preferred as the electrical resistance of the head is thereby reduced.

A photoresist mask 36 is used in patterning electrode film 26, as shown in FIG. 6(e). Although the shunt bias film 5 and the under gap film 3 both are etched in this process, the etching amount is negligible. This is due to the fact that the Cr film is thin and that the ion milling speed of Cu is higher than that of $Al_2O_3$, which is the material of the under gap film 3 and of Nb, which is the material of the shunt bias film 5. When the shunt bias film 5 is rendered thinner as the S/N ratio is increased, however, it causes the bias magnetic field to fluctuate. In this case, a processing technique such as the lift-off technique is effective in that the primary film is prevented from being damaged. Moreover, no problem results from the use of Au, Al, or W having small electrical receptivity or an alloy mainly containing these materials in place of Cu. In place of a Cr film, the same material (Nb in this case) that has been used to form the shunt bias film 5 may also be employed.

After the mask 36 is removed, the structure shown in FIG. 6(f) is obtained. Then, the upper gap film 27 is formed in a process step not shown. The upper gap film 27 is formed of $Al_2O_3$ as in the case of the under gap film 23. The film thickness is 0.13 μm. An $Al_2O_3$ film in a terminal portion for external connection is removed by ion milling. As a result, the upper gap film 27 is laid on the electrode separation layer 33. The $Al_2O_3$ film in this case becomes 0.3 μm thick.

Finally, the upper shield film 28 is formed of an Ni—Fe alloy as in the case of the under shield film. The film thickness is 3 μm. Patterning is also carried out in such a way as to remove the upper shield film 28 in part at least on the electrode separation layer 33, whereby the upper shield film 28 is insulated from the electrode film 26 or the lead 31, as shown in FIG. 5(b). It is preferred to leave the upper shield film 28 in a terminal portion 29 as the electrical resistance of the head is reduced thereby since a three electrode structure is produced.

The electrode separation layer 33 and the upper gap film 27 thereon are etched when the upper shield film 28 is subjected to milling in this process and the problem is that the lead is exposed. However, the total thickness of both films is as great as 0.3 μm. Assuming the time required to etch the electrode separation layer 33 and the upper gap film 27 thereon is 20% of the total milling time of the upper shield film 28, an $Al_2O_3$ film of a thickness of about 0.1 μm thick can be left.

As stated with respect to the first embodiment of the present invention, the third embodiment thereof is effectively applicable to other bias methods under which soft or composite bias type (a combination of the shunt and soft bias types) heads are produced. The present embodiment is still further effective in producing a head in which a magnetic domain film is laid on top of the magnetoresistive film 4 to suppress Barkhausen noise.

As the magnetic domain film, a permanent magnet film or an anti-ferro-magnetic film can be effectively used.

According to a modification of the third embodiment of the present invention, in order to increase recording density and the S/N ratio, the magnetoresistive film 24 is made to be about 15 nm thick and the upper and under gap films 23, 27 are formed to be about 0.1 μm thick. In this case, the time required to etch the primary film (consisting of the electrode separation layer 33 and the upper gap film 27) of the upper shield film 28 is set to be about 10% of the total milling time of the upper shield film 28 so as to suppress the film thickness and the distribution of ion milling speed. The head intended for the purpose can be made without any problem. In other words, $Al_2O_3$ 0.1 μm thick can be left even when the upper shield film is made 3 μm thick.

According to the third embodiment of the present invention and the modifications thereto as disclosed herein, the electrode film 26 is prevented from being etched even when the upper shield film 28 is subjected to milling. Moreover, the primary film in the area which poses problems when the upper shield film 28 is subjected to milling can be formed with two layers of the electrode separation layer 33 (formed from the under gap film) and the upper gap film. For this reason, the lead 31 is prevented from being exposed.

Consequently, the electrode is free from breakdown which often occurs with magnetoresistive heads constructed according to the prior art and the yield rate is significantly improved with respect thereto.

We claim:

1. A magnetoresistive head, comprising:
   a substrate, an under shield film formed on the substrate, an under gap film formed on the under shield film, a magnetoresistive film formed on said under gap film, an upper gap film formed on said magnetoresistive film, an upper shield film formed on said upper gap film, an electrode film electrically connected to said magnetoresistive film and formed between said under gap film and the upper gap film, and a lead connected to said electrode film; and
   a laminated area formed by directly laying said upper gap film on said under gap film, wherein one end of said upper shield film is formed on said laminate.

2. A magnetoresistive head as claimed in claim 1, wherein said electrode film and said lead are electrically connected by through holes formed in one of said upper and said under gap films.

3. A magnetoresistive head according to claim 1, wherein said lead is formed of the same material as that used to form said upper shield film and is in contact with said electrode film, said contact being formed by through-holes made in said under gap film.

4. A magnetoresistive head according to claim 1, wherein a conductive layer is formed on said lead and wherein one end of said conductive layer is formed on said laminated area.

5. A magnetoresistive head as claimed in claim 1, wherein said conductive layer formed on said lead is made of the same material as that used to form one of said electrode film and said upper shield film.

6. A magnetoresistive head, comprising:
   a substrate, a layer film formed on the substrate including an under shield film portion and a lead portion, a second layer formed on said first layer and on an area of said substrate separating said under shield film portion and said lead portion, said second layer having an under gap film portion and an electrode separation portion;
   a magnetoresistive film formed on said second layer at a transducing end thereof;
   a third layer formed on said second layer constituting an electrode film in electrical contact with said magnetoresistive film;
   an upper gap film formed on said third layer, wherein a portion of said electrode film is removed to permit an overlaying portion of said upper gap film to be directly formed on the electrode separation portion; and
   an upper shield film formed on said upper gap film and having a portion aligned with said overlaying portion of said upper gap film that is removed after the upper shield film is formed.

7. A magnetoresistive head according to claim 6, wherein the electrode separation portion has one end portion extending toward an air bearing surface portion of the head and an opposite end portion extending away therefrom, and wherein said electrode film is directly formed on said lead portion of said first layer in areas adjacent each of the opposite ends of the electrode separation portion.

8. A magnetic head according to claim 7, wherein said electrode film is formed to cover each of the opposite ends of the electrode separation portion.

9. A magnetoresistive head according to claim 6, wherein said upper gap film and said electrode separation portion are formed of the same material.

10. A magnetoresistive head according to claim 9, wherein said material of said upper gap film and said electrode separation portion is $Al_2O_3$, and wherein a total thickness of the electrode separation portion and upper gap film layer below the portion of the upper shield film that is removed has a sufficient thickness to prevent undesirable etching of said upper gap film and said electrode separation portion.

11. A magnetoresistive head according to claim 6, wherein said electrode separation portion and said upper gap film are formed of $Al_2O_3$, and said electrode film is formed of a laminate of Cr/Cu/Cr.

* * * * *